United States Patent
Putilin et al.

(10) Patent No.: US 6,843,564 B2
(45) Date of Patent: Jan. 18, 2005

(54) THREE-DIMENSIONAL IMAGE PROJECTION EMPLOYING RETRO-REFLECTIVE SCREENS

(75) Inventors: Andrey N. Putilin, Moscow (RU); Andrew A. Lukyanitsa, Moscow (RU)

(73) Assignee: Neurok LLC, McLean, VA (US)

(*) Notice: Subject to any disclaimer, the term of this patent is extended or adjusted under 35 U.S.C. 154(b) by 0 days.

(21) Appl. No.: 10/336,842

(22) Filed: Jan. 6, 2003

(65) Prior Publication Data

US 2003/0156260 A1 Aug. 21, 2003

Related U.S. Application Data

(60) Provisional application No. 60/346,386, filed on Jan. 7, 2002, and provisional application No. 60/345,245, filed on Jan. 4, 2002.

(51) Int. Cl.[7] .................. G03B 21/00; G02B 27/22; H04N 15/00
(52) U.S. Cl. .................. 353/7; 359/462; 348/51
(58) Field of Search .................. 353/7, 10; 349/15; 359/462; 348/42, 47, 51

(56) References Cited

U.S. PATENT DOCUMENTS

| | | | |
|---|---|---|---|
| 4,717,949 A | | 1/1988 | Eichenlaub .................. 358/3 |
| 5,457,574 A | | 10/1995 | Eichenlaub .................. 359/619 |
| 5,497,189 A | | 3/1996 | Aritake et al. .................. 348/51 |
| 5,745,197 A | | 4/1998 | Leung et al. .................. 349/77 |
| 5,754,147 A | * | 5/1998 | Tsao et al. .................. 345/6 |
| 5,764,317 A | | 6/1998 | Sadovnik et al. .................. 349/5 |
| 5,872,590 A | | 2/1999 | Aritake et al. .................. 348/57 |
| 5,930,037 A | | 7/1999 | Imai .................. 359/463 |
| 5,945,965 A | | 8/1999 | Inoguchi et al. .................. 345/6 |
| 6,034,717 A | * | 3/2000 | Dentinger et al. .................. 353/7 |
| 6,201,565 B1 | * | 3/2001 | Balogh .................. 348/51 |
| 6,304,294 B1 | * | 10/2001 | Tao et al. .................. 348/370 |
| 6,442,465 B2 | | 8/2002 | Breed et al. .................. 701/45 |
| 6,554,431 B1 | * | 4/2003 | Binsted et al. .................. 353/28 |
| 2003/0067539 A1 | * | 4/2003 | Doerfel et al. .................. 348/51 |

FOREIGN PATENT DOCUMENTS

| | | |
|---|---|---|
| RU | 2090979 | 9/1997 |
| RU | 2116704 | 4/1998 |
| RU | 2108687 | 7/1998 |
| WO | 01/71665 A2 | 9/2001 |

OTHER PUBLICATIONS

International Search Report dated Jul. 24, 2003, for Application No. PCT/US03/00197.

International Search Report for PCT Application No. PCT/RU 00/00343.

\* cited by examiner

*Primary Examiner*—Christopher Mahoney
(74) *Attorney, Agent, or Firm*—Hogan & Hartson LLP

(57) ABSTRACT

Disclosed herein are three-dimensional projection systems and related methods employing two electronically controlled projectors and a retro-reflective screen. The retro-reflective screen produces a known non-linear light reflection pattern when images are projected thereon. Image computational means are used to calculating flat image information for each projector based upon inputted stereopair images and information regarding the projectors and screen. In preferred embodiments of the present invention, the projection system uses an image computational device that employs a neural network feedback calculation to calculate the appropriate flat image information and appropriate images to be projected on the screen by the projectors at any given time. More than two projectors can be employed to produce multiple aspect views, to support multiple viewers, and the like. In another embodiment, the projection system includes a digital camera that provides feedback data to the image computational device.

38 Claims, 8 Drawing Sheets

THREE-DIMENSIONAL IMAGE PROJECTION EMPLOYING RETRO-REFLECTIVE SCREENS

REFERENCE TO RELATED APPLICATIONS

This application claims the benefit of the filing dates of U.S. provisional patent application Ser. No. 60/345,245, filed Jan. 4, 2002, and U.S. provisional patent application Ser. No. 60/346,386, filed Jan. 7, 2002.

FIELD OF THE INVENTION

The present invention relates to the projection of three-dimensional images. More particularly, the present invention relates to apparatuses and related methods for three-dimensional image projection utilizing stereo aspect images projected onto a retro-reflective screen.

BACKGROUND OF THE INVENTION

Projective displays use images focused onto a diffuser to present an image to a user. The projection may be done from the same side of the diffuser as the user, as in the case of cinema projectors, or from the opposite side. Prior art projection systems of the retro-reflective screen type used in, for example, movie theaters, as depicted in FIG. 1, typically produce a two-dimensional image by using a single projector 10 to project a single image at a time onto a screen 12. Screen 12 would have a linear light distribution such that all viewers of the image reflected by screen 12 would see the same two-dimensional image regardless of the positions at which they are located.

In many contemporary projection systems, the image can be generated on one or more "displays," such as a miniature liquid crystal display device that reflects or transmits light in a pattern formed by its constituent switchable pixels. Such liquid crystal displays are generally fabricated with micro-electronics processing techniques such that each grid region, or "pixel," in the display is a region whose reflective or transmissive properties can be controlled by an electrical signal. In an liquid crystal display, light incident on a particular pixel is either reflected, partially reflected, or blocked by the pixel, depending on the signal applied to that pixel. In some cases, liquid crystal displays are transmissive devices where the transmission through any pixel can be varied in steps (gray levels) over a range extending from a state where light is substantially blocked to the state in which incident light is substantially transmitted.

When a uniform beam of light is reflected from (or transmitted through) a liquid crystal display, the beam gains a spatial intensity profile that depends on the transmission state of the pixels. An image is formed at the liquid crystal display by electronically adjusting the transmission (or gray level) of the pixels to correspond to a desired image. This image can be imaged onto a diffusing screen for direct viewing or alternatively it can be imaged onto some intermediate image surface from which it can be magnified by an eyepiece to give a virtual image.

The three-dimensional display of images, which has long been the goal of electronic imaging systems, has many potential applications in modern society. For example, training of professionals, from pilots to physicians, now frequently relies upon the visualization of three-dimensional images. Understandably, three-dimensional imaging also has numerous potential applications in entertainment. In many applications of three-dimensional imaging it is important that multiple aspects of an image be able to be viewed so that, for example, during simulations of examination of human or mechanical parts, a viewer can have a continuous three-dimensional view of those parts from multiple angles and viewpoints without having to change data or switch images.

Thus, real-time, three-dimensional image displays have long been of interest in a variety of technical applications. Heretofore, several techniques have been known in the prior art to be used to produce three-dimensional and/or volumetric images. These techniques vary in terms of complexity and quality of results, and include computer graphics which simulate three-dimensional images on a two-dimensional display by appealing only to psychological depth cues; stereoscopic displays which are designed to make the viewer mentally fuse two retinal images (one each for the left and right eyes) into one image giving the perception of depth; holographic images which reconstruct the actual wavefront structure reflected from an object; and volumetric displays which create three-dimensional images having real physical height, depth, and width by activating actual light sources of various depths within the volume of the display.

Basically, three-dimensional imaging techniques can be divided into two categories: those that create a true three-dimensional image; and those that create an illusion of seeing a three-dimensional image. The first category includes holographic displays, varifocal synthesis, spinning screens and light emitting diode ("LED") panels. The second category includes both computer graphics, which appeal to psychological depth cues, and stereoscopic imaging based on the mental fusing of two (left and right) retinal images. Stereoscopic imaging displays can be sub-divided into systems that require the use of special glasses, (e.g., head mounted displays and polarized filter glasses) and systems based on auto-stereoscopic technology that do not require the use of special glasses.

Holographic imaging technologies, while being superior to traditional stereoscopic-based technologies in that a true three-dimensional image is provided by recreating the actual wavefront of light reflecting off a the three-dimensional object, are more complex than other three-dimensional imaging technologies. Thus, recent work in the field of real time thee dimensional electronic display systems has concentrated on the development of various stereoscopic viewing systems as they appear to be the most easily adapted commercially.

Recently, the auto-stereoscopic technique has been widely reported to be the most acceptable for real-time full-color three-dimensional displays. The principle of stereoscopy is based upon the simultaneous imaging of two different viewpoints, corresponding to the left and right eyes of a viewer, to produce a perception of depth to two-dimensional images. In stereoscopic imaging, an image is recorded using conventional photography of the object from different vantages that correspond, for example, to the distance between the eyes of the viewer.

Ordinarily, for the viewer to receive a spatial impression from viewing stereoscopic images of an object projected onto a screen, it has to be ensured that the left eye sees only the left image and the right eye only the right image. While this can be achieved with headgear or eyeglasses, auto-stereoscopic techniques have been developed in an attempt to abolish this limitation. Conventionally, however, auto-stereoscopy systems have typically required that the viewer's eyes be located at a particular position and distance from a view screen (commonly known as a "viewing zone") to produce the stereoscopic effect.

One way of increasing the effective viewing zone for an auto-stereoscopic display is to create multiple simultaneous viewing zones. This approach, however, imposes increasingly large bandwidth requirements on image processing equipment. Furthermore, much research has been focused on eliminating the restriction of viewing zones by tracking the eye/viewer positions in relation to the screen and electronically adjusting the emission characteristic of the imaging apparatus to maintain a stereo image. Thus, using fast, modern computers and motion sensors that continuously register the viewer's body and head movements as well as a corresponding image adaptation in the computer, a spatial impression of the environment and the objects (virtual reality) can be generated using stereoscopic projection. As the images become more complex, this prior art embodying this approach has proven less and less successful.

Because of the nature of stereoscopic vision parallax can be observed only from discrete positions in limited viewing zones in prior art auto-stereoscopy systems. For example, any stereoscopic pair in standard auto-stereoscopy systems gives the correct perspective when viewed from one position only. Thus, auto-stereoscopic display systems must be able to sense the position of the observer and regenerate the stereo-paired images with different perspectives as the observer moves. This is a difficult task that has not been mastered in the prior art.

In light of the current state of the art of image projection, it would be desirable to have a system that is capable of projecting numerous aspects or "multi-aspect" images such that the user can see many aspects and views of a particular object when desired. It would further be useful for such viewing to take place in a flexible way so that the viewer is not constrained in terms of the location of the viewer's head when seeing the stereo image. Additionally, it would be desirable for such a system to be able to provide superior three-dimensional image quality while being operable without the need for special headgear. Thus, there remains a need in the art for improved methods and apparatuses that enable the projection of high-quality three-dimensional images to multiple viewing locations without the need for specialized headgear.

SUMMARY OF THE INVENTION

In view of the foregoing and other unmet needs, it is an object of the present invention to provide a three-dimensional image projection system that enables projection of multiple aspects and views of a particular object.

Similarly, it is an object of the present invention to provide apparatuses and associated methods for multi-aspect three-dimensional imaging that provides high resolution images without having to limit the viewer to restricted viewing zones.

Also, it is an object of the present invention to provide apparatuses and associated methods for multi-aspect three-dimensional imaging that can simultaneously provide different views to different viewers located at different viewing locations relative to one another.

Additionally, it is an object of the present invention that such apparatuses and the associated methods do not require the viewer to utilize specialized viewing equipment, such as headgear or eyeglasses.

Further, it is an object of the present invention to provide three-dimensional displays and related imaging methods that can display various images and perspectives of an object using image pairs which have been calculated to produce a perceived three-dimensional image when simultaneously projected for viewing.

To achieve these and other objects, three-dimensional projection systems and related methods according to the invention employ at least two projectors, an imaging system that controls the projectors, and a retro-reflective screen upon which is projected multiple images of an object as created by the projectors. The imaging systems of the projection systems according to embodiments of the present invention are capable of numerically calculating image information and using that information to control the characteristics of the projectors to produce stereo images. In embodiments of the invention wherein the projectors have liquid crystal imaging display elements incorporated therein, the imaging system is adapted to control the liquid crystal display elements within the projectors to modify the images being projected. The calculated image information relates to a desired three-dimensional image scene. The calculated image information in such embodiments causes the liquid crystal displays to be controlled in such a manner that a desired image is produced thereon, and light passes through the display and hits the screen where it is diffused or reflected according to the characteristics of the screen to produce a viewable three-dimensional image.

In embodiments of the invention, the retro-reflective screen reflects light according to a non-linear distribution pattern that depends upon the angle of reflection between the light origination source and the surface of the screen.

In preferred embodiments of the invention, the imaging system comprises at least two projectors, each projector having one or more electronically controllable liquid crystal display panels and a light source, an image generation system for performing calculations regarding three-dimensional image generation and for controlling the liquid crystal panels, and a retro-reflective screen.

Also in preferred embodiments of the present invention, a system and method for presentation of multiple aspects of an image to create a three dimensional viewing experience utilizes at least two image projectors, an image generation system for controlling the projectors, and a retro-reflector screen to generate a three dimensional viewable image. The image generation system in such preferred embodiments is an auto-stereoscopic image generation system that employs a neural network feedback calculation to calculate the appropriate stereoscopic image pairs to be displayed at any given time. In such embodiments, the projectors each preferably include at least one electronically controllable liquid crystal display element or other suitable spatial light modulator (SLM).

According to alternative versions of any of the above embodiments of the present invention, separate sets of liquid crystal display ("LCD") panels can be used for each color in each projector such that full color displays can be obtained. In one such alternative embodiment, three individual LCD panels can be provided in each projector, corresponding to red light, blue light, and green light. In one particular alternative embodiment, the projectors are a tri-chromatic color-sequential projectors having three light sources for three different colors, such as red, green, and blue, for example. The image display sequentially displays red, green, and blue components of an image. The liquid crystal display and the light sources are sequentially switched so that when a red image is displayed, the corresponding liquid crystal display is illuminated with light from the red source. When the green portion of the image is displayed by the appropriate liquid crystal display, that display is illuminated with light from the green source, etc.

Another embodiment of present invention provides a system and related scheme for multi-aspect image matching.

This embodiment of the projection system includes a digital camera and corresponding image capturing and processing software. In general, the system functions to create a feedback loop in which data related to the appearance of projected images is collected and analyzed to determine any modification to the projection system needed to achieve desired image characteristics. For the purposes of image mapping, the projected image is generally a two-dimensional array of color points or a series of the orthogonal lines transmitted onto a screen. Each projector emits a slightly different image on the screen, and the camera captures the different images. To ease detection of the differences in the test images, the image matching screen is preferably a white paper or a conventional projection screen that is temporarily placed over the retro-reflection screen.

In another embodiment of the present invention, the 3D projection system uses a retro-reflective screen that produces a scattering pattern having relatively low-angle horizontal scattering rays relatively large-angle vertical scattering rays. This desired scatter pattern may be produced by a retro-reflective screen formed by embossing two series of micro-prisms on a transparent polymer film. Specifically, a front surface is embossed with high spatial frequency horizontal prisms while a rear surface is embossed with low spatial frequency 90-degree micro-prisms that perform one-dimensional retro-reflection on total internal reflection. In another embodiment, the retro-reflective screen is the combination of a micro-prism retro-reflector film and a one-dimensional micro-prism array scattering film.

Various preferred aspects and embodiments of the invention will now be described in detail with reference to figures.

DETAILED DESCRIPTION OF THE PREFERRED EMBODIMENTS

The present invention in its preferred embodiment is an image projection system and related method for presentation of multiple aspects of an image to create a three dimensional viewing experience using at least two image projectors, an image generation system for controlling the image projectors, and a retro-reflective screen.

Figure 2:
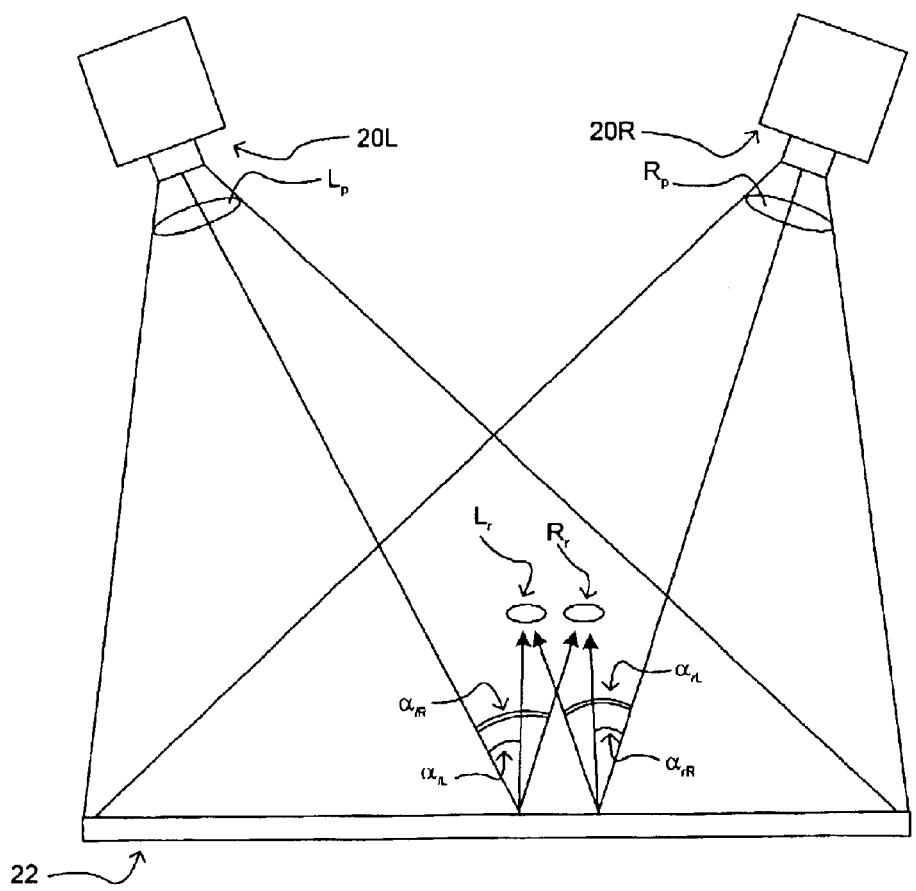
FIG. 2 is a schematic diagram depicting the projection of three-dimensional images according to embodiments of the present invention.

FIG. 2 schematically depicts the projection of three-dimensional images according to one embodiment of the present invention. As illustrated in FIG. 2, a three-dimensional or stereographic image is presented to a viewer using at least two projectors 20L and 20R to project calculated image $L_p$ and calculated image $R_p$, respectively, such as from respective transmissive LCDs or other similar pixel-based displays, onto the retro-reflective screen 22 to present appropriate retro-reflected images $L_r$ and $R_r$ to the viewer's left and right eyes.

Figure 1:
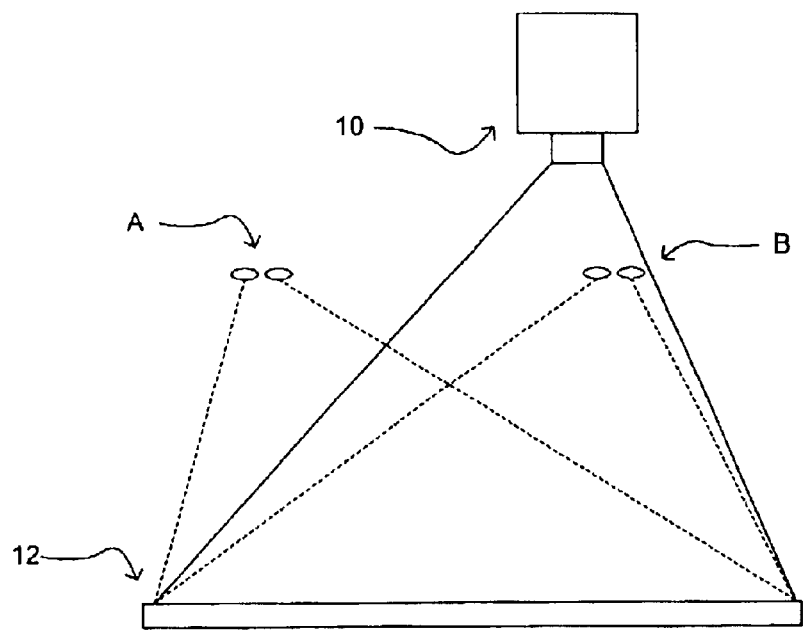
FIG. 1 is an illustration of one method employed in the prior art to project a viewable two-dimensional image onto a viewing screen.
Figure 3:
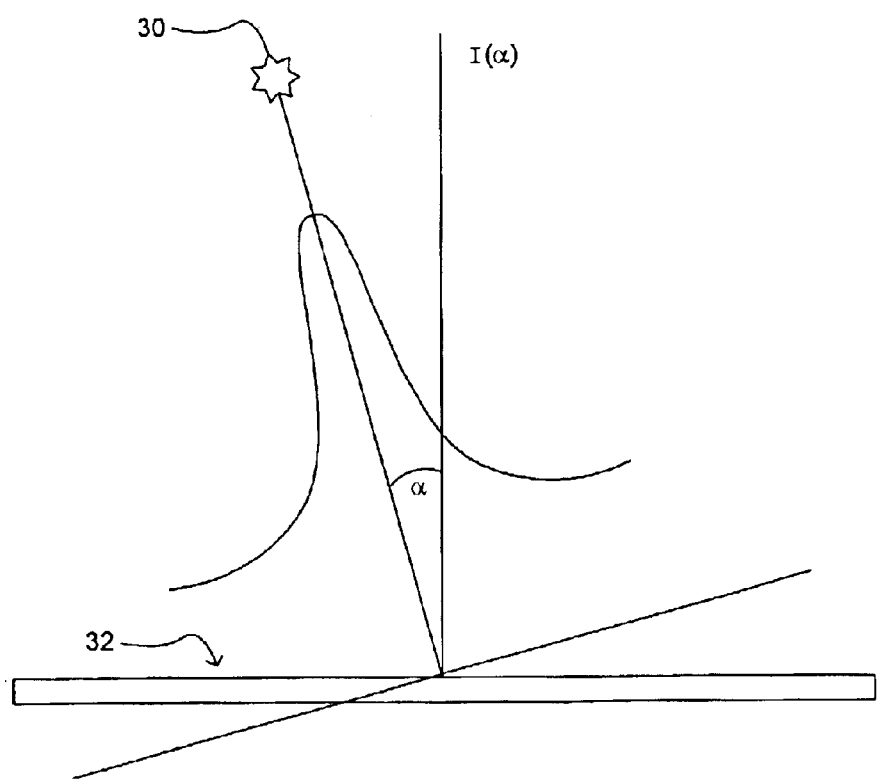
FIG. 3 is a diagram illustrating a non-linear light distribution as produced by one retro-reflective screen that may utilized in embodiments of the present invention.

In embodiments of the invention, the retro-reflective screen 22 reflects light according to a non-linear distribution pattern that depends upon the angle of reflection between the light origination source and the surface of the screen. A non-linear light distribution of one suitable retro-reflective screen is illustrated in FIG. 3, wherein the retro-reflector screen 22 generates a reflected light distribution that depends on reflection incidence angle $\alpha$ between the light source 20 and screen 22. The reflected light distribution of FIG. 3 is in accordance with a Gaussian distribution wherein light intensity $I(\alpha)$ can be represented by the equation $$I(\alpha) = I_0 \cdot \exp\left(-\frac{\alpha^2}{\sigma^2}\right) \qquad \text{Eq. 1}$$

at the viewing point at the angle $\alpha$. The peak intensity of the light is given by the constant $I_0$, and $\sigma$ is a constant and depends on the screen characteristics of the particular retro-reflective screen employed.

With respect to the two-projector embodiment of FIG. 2, the observed image for the left and right eyes can be mathematically presented as:

$$I(L) = I_{0l} \cdot \exp\left(-\frac{\alpha_{lL}^2}{\sigma^2}\right) + I_{0r} \cdot \exp\left(-\frac{\alpha_{rL}^2}{\sigma^2}\right) \qquad \text{Eq. 2}$$

$$I(R) = I_{0l} \cdot \exp\left(-\frac{\alpha_{lR}^2}{\sigma^2}\right) + I_{0r} \cdot \exp\left(-\frac{\alpha_{rR}^2}{\sigma^2}\right) \qquad \text{Eq. 3}$$

where, in equations Eq. 2 and Eq. 3, $I_{ol}$ is the brightness of the left projector image, and $I_{or}$ is the brightness of the right projector image. By fixing I(L) and I(R) for any specific point, one can generate the system of equations for $I_{ol}$ and $I_{or}$, which corresponds to the calculated images L and R thereafter produced by the left and right projectors. The system of equations produced is non-linear and non-convertible. Therefore, it can only be solved approximately.

A particularly suitable means for calculating this solution is with an artificial neural network operating on a computer. The application of a neural network to an equivalent three-dimensional imaging problem is described in detail in co-owned and co-pending U.S. utility patent application Ser. No. 09/977,462, filed Oct. 15, 2001, and entitled "System and Method for Visualization of Stereo and Multi Aspect Images", the specification of which is herein incorporated by reference in its entirety.

Figure 4:
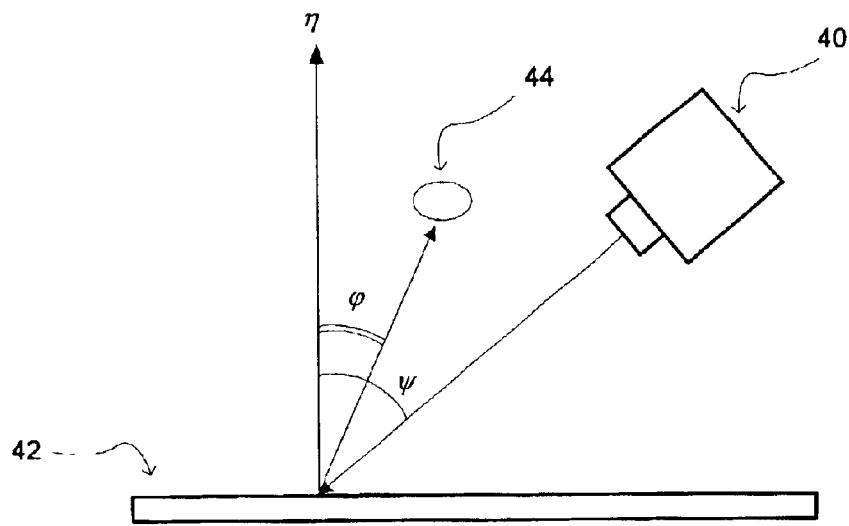
FIG. 4 is a schematic diagram illustrating the geometry of employing a single projector to transmit image information to the eye of a viewer via a reflective screen.

FIG. 4 schematically illustrates the geometry of a projection system that employs a single projector to transmit image information to the eye of a viewer via a reflective screen. Although systems according to the present invention use two or more projectors to produce perceived three-dimensional images, the single projector and screen arrangement illustrated in FIG. 4 is helpful in understanding the calculations involved in determining the proper images to be displayed by each of the two or more projectors actually employed.

As depicted in FIG. 4, a single projector 40 is oriented in vertical direction toward the retro-reflective screen 42 at an angle ψ. In this setup, the viewer's eye 44 is at same horizontal level as projector 40. In such an arrangement, for each fixed vertical angle, one can determine the following equation for image $I_e$, which image is observed by eye 44 in part of the screen 42 for angles in a defined viewing range φ∈[φ$_1$, φ$_2$] from the normal direction:

$$I_e(\phi) = I(\psi) \cdot K(|\phi - \psi|) \qquad \text{Eq. 4}$$

In equation Eq. 4, I(ψ) is a function defining the brightness of the projected light beam that travels from the projector 40 to the retro-reflective screen 42 at an angle ψ from the normal direction η. The K(|φ−ψ|), or the function of the kernel, is non-linear and is defined by the reflective features of the screen. An example of a kernel function is the below-listed Eq. 1', in which original Eq. 1 has modified by substituting the angle defined by |φ−ψ| for the angle α.

$$K(|\varphi - \psi|) = I_0 \cdot \exp\left(-\frac{|\varphi - \psi|^2}{\sigma^2}\right), \qquad \text{Eq. 1'}$$

Figure 5:
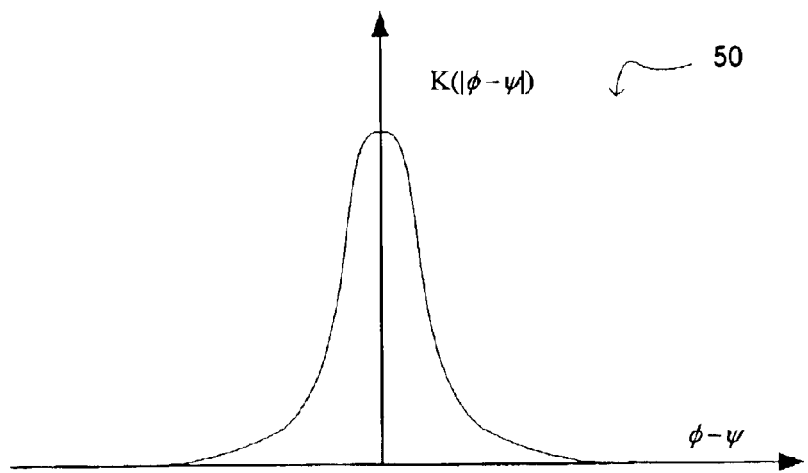
FIG. 5 is a diagram depicting a non-linear light distribution, or kernel, as produced by a retro-reflective screen employed in one embodiment of the present invention.

The form of this kernel function in a two-dimensional case is plotted in the 50 graph of FIG. 5. As indicated above with respect to FIG. 4, angles φ and ψ as plotted in FIG. 5 are determined from the normal direction η.

If the system described by Eq. 4 is expanded to include a number of projectors in same horizontal level, the equation for the resulting image in eye 44 is as follows:

$$I_e(\varphi) = \sum_{i=1}^{n} [I_i(\psi) \cdot K(|\varphi - \psi|)] \qquad \text{Eq. 5}$$

where n is the number of projectors in the system, and I(ψ) is the brightness of light beam from projector i that approaches the screen with angle ψ from the normal direction.

To create m different images $I_e(1)$ through $I_e(m)$ for different eyes or eye positions, one needs to solve the following equation system having m equations:

$$I_e(1) = \sum_{i=1}^{n} [I_i(\psi) \cdot K(|\varphi_1 - \psi|)] \qquad \text{Eq. 6}$$

$$I_e(2) = \sum_{i=1}^{n} [I_i(\psi) \cdot K(|\varphi_2 - \psi|)] \qquad \text{Eq. 7}$$

$$I_e(m) = \sum_{i=1}^{n} [I_i(\psi) \cdot K(|\varphi_m - \psi|)] \qquad \text{Eq. 8}$$

for n unknown brightness's $I_i(\psi)$ for all projectors. Note that angle ψ does not generally change since the positioning of the projector(s) does not vary significantly. This system may be solved employing a neural network as described above. Although disclosed in a particular embodiment, one of ordinary skill in the art will readily appreciate how many other equivalent geometries can be employed by adapting equations Eq. 1 through Eq. 8 accordingly. The appropriate equations are thereafter used to calculate images that are projected by the various projectors in embodiments of the present invention.

Figure 6:
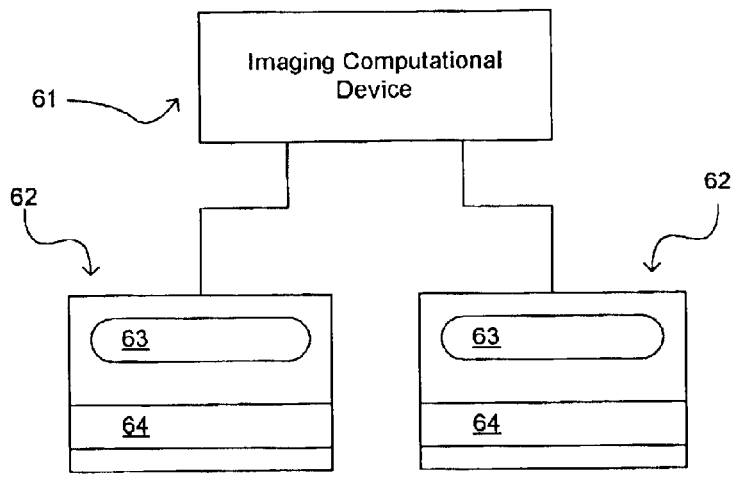
FIG. 6 is a schematic diagram depicting the parts of a projection system according to embodiments of the present invention.

FIG. 6 is a schematic diagram depicting the parts of a projection system according to preferred embodiments of the present invention, which parts may be arranged as depicted in FIG. 2 to project a perceived three-dimensional object to a viewer. As described above, in stereoscopic systems it is necessary for the viewer's right eye to perceive a different image from the left eye in order to produce a perceived three-dimensional image. As depicted in FIG. 6, an imaging computational device 61 is communicatively coupled to and provides control for at least two image projectors 62 oriented in a known arrangement toward a retro-reflective screen. Each projector comprises at least one transmissive panel 64 (or other suitable electronic display element) for producing images and an illumination source 63, both of which being controlled by the imaging computational device 61. Illumination source 63 is adapted to illuminate the transmissive panel 64 as the panel displays images as provided it by the imaging computational device 61. The image displayed on any transmissive panel 64 in any projector 62 is coordinated by the imaging computational device 61 with those images displayed and projected by other projectors 62.

Generally, transmissive panel 64 is an LCD panel. LCD panels are well-known pixilated devices in which each pixel is either "on" or "off" or set to an intermediate intensity level. Each of the LCD panels is typically monochromatic and cannot individually control the intensity of more than one color component of the image. To provide color control, an LCD multi-panel system may be employed in each projector. Such LCD multi-panel systems typically use three independent LCD panels. Each of the three LCD panels is illuminated by a separate light source with spectral components that stimulate one of the three types of cones in the human eye. The three LCD panels each reflect (or transmit) a beam of light that makes one color component of a color image. The three beams are then combined through prisms, a system of dichromic filters, and/or other optical elements into a single chromatic image beam. Alternatively, separate liquid crystal display panels and multiple single-color light sources corresponding to each primary color can be used in each projector to produce multi-color displays by synchronous switching of different colored light sources and the LCD panels as is known in the art.

Also as is known in the art, in another embodiment each color panel system can be used for sequential color switching. In this embodiment, the LCD panels can be coupled in a projector with red, blue, and green colored switchable illumination sources. Each set of these colored sources is activated one at a time in sequence, while the LCD panel simultaneously cycles through blue, green, and red components of an image to be displayed. The LCD panels and corresponding light sources are switched synchronously with the image on display at a rate that is fast compared with the integration time of the human eye (less than 100 microseconds). Understandably, it is then possible to use a single monochromatic LCD panel in each projector and still provide a color calculated image.

It should be further appreciated that transmissive panel 64 may be other type of electronically controllable device for creating a projected image. For example, instead of the LCD panels, various embodiments of the present invention may employ a suitable spatial light modulator (SLM), such as a digital light processor (DLP) produced by Texas Instruments, Inc. of Dallas, Tex.

Figure 7:
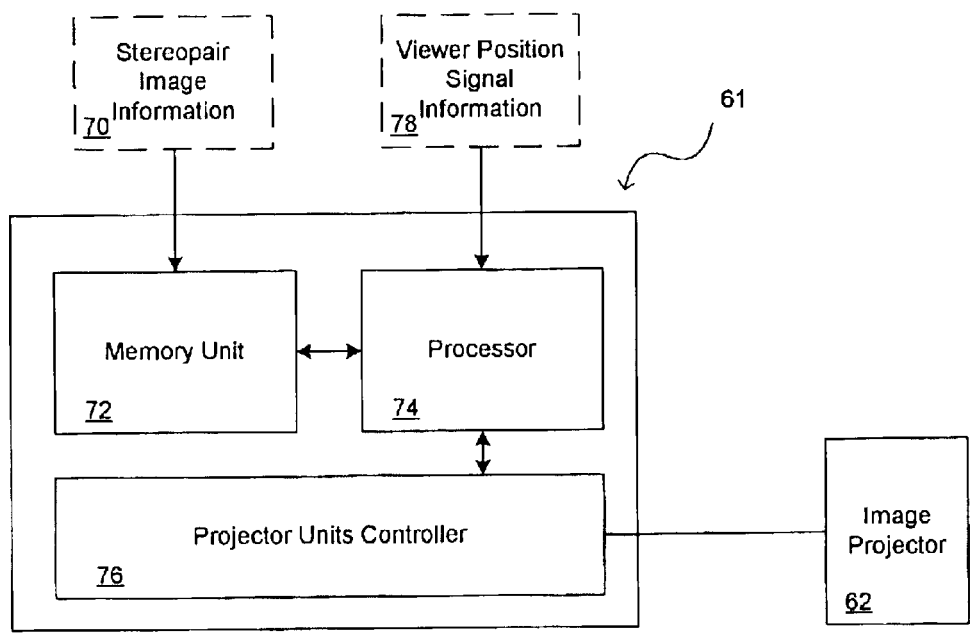
FIG. 7 is a schematic diagram depicting the computational and control architecture of an imaging computational unit as utilized in embodiments of the present invention.

FIG. 7 is a schematic diagram depicting the computational and control architecture of a suitable imaging computational unit 61 as utilized in embodiments of the present invention as depicted in FIG. 6. Referring to FIG. 7, the imaging computational device utilizes a database of stereopairs 70 (or various image aspects) which are provided to its memory unit 72. Memory unit 72 has several functions as will be known in the art of computing. One such function is that memory unit 72 will extract and store a particular stereopair from the stereopair database 70 for use as directed by a processor 74.

Memory unit 72 provides the desired stereopair to the processor 74 to produce calculated images ($L_p$ and $R_p$ as described above with respect to FIG. 2). These calculated images, once produced, are sent from processor 74 to liquid a projector units controller 76 (or alternatively stored in memory unit 72 to be accessed by controller 76). Projector units controller 76 then provides the calculated images to the appropriate transmissive panel 64 and controls the lighting of illumination source 63 that illuminates the transmissive panel 64 in each image projector 62. Alternatively, processor 74 could provide instructions to the individual panels 64 and illumination sources to control the projectors using appropriate driver software as is known in the art.

As is the case with all auto-stereoscopic displays, the images produced by the computing device 71 are necessarily a function of the viewer position, as indicated by the inputting of viewer position signal information 78 in FIG. 7. Various suitable methods are known in the art for producing viewer position signal information. For example, U.S. Pat. No. 5,712,732 issued to Street describes an auto-stereoscopic image display system that automatically accounts for observer location and distance. The Street display system comprises a distance measuring apparatus allowing the system to determine the position of the viewer's head in terms of distance and position (left-right) relative to the screen. Similarly, U.S. Pat. No. 6,101,008 issued to Popovich teaches the utilization of digital imaging equipment to track the location of a viewer in real time and use that tracked location to modify the displayed image appropriately.

It should be noted that memory unit 72 holds the accumulated signals of individual cells or elements of each LCD panel. Thus the memory unit 72 and processor 74 have the ability to accumulate and analyze the light that is traveling through relevant screen elements of the liquid crystal display panels toward the retro-reflective screen.

The data flow for the manipulation of the images of the present invention between the memory unit 72, processor 74, and projector units controller 76 results in the regulation of the luminous radiation emanating from the illumination source 63 and the transmissivity of the transmissive panel 64 in each projector 62 (only one such projector being shown in FIG. 7 for sake of simplicity). Information concerning multiple discreet two-dimensional images (i.e., multiple calculated images) of an object, each of which is depicted in multiple different areas on the LCD panels, and, optionally, information about positions of the right and left eyes of the viewer are continuously adjusted by the processor 74 to produce new calculated images for projection. To enable the calculations to take place, signals corresponding to the transmission state of a portion of each panel 64 for each projector 62 are input to the processing block following the set program.

Each of these left and right eye signals is summed to create calculated image value for the right eye and for the left eye. These signals are then compared in a compare operation to the relevant parts of the stored stereopair images of each aspect and to the relevant areas of the image of the object aspects.

Keeping in mind that the signal is of course a function of the location of the viewer's eyes, the detected signal can vary to some extent. Any errors from the comparison are identified for each cell of each LCD panel. Each error is then compared to a preset threshold signal and, if the error signal exceeds the preset threshold signal, the processor control routine changes the signals corresponding to the transmissivity of the LCD panels.

If the information concerning the calculated images of the object changes, as a result of movement of the viewer position (or a desire to project a different image), the processor recognizes this change and inputs into the memory unit signals corresponding to luminous radiation of the illumination source as well as the transmissivity of the appropriate LCD panel cells until the information is modified. When the viewer position varies far enough to require a new view, that view or image is extracted from the database and processed accordingly.

The signals corresponding to the transmissivity of the two projectors' are input into the memory unit by means of the processing block following the set program. The next step is to identify the light signals that can be directed from the projectors off of the screen and towards the right and left eyes of at least one viewer, Then compare the identified light signals directed towards each eye to the corresponding areas of the set two-dimensional stereopair image of the relevant object.

For each cell of each LCD panel, the error signal is identified between the identified light signal that can be directed towards the relevant eye and the identified relevant area of the stereo picture of the relevant object aspect that the same eye should see. Each received error signal is compared to the set threshold signal. If the error signal exceeds the set threshold signal, the mentioned program of the processing block control changes the signals corresponding to the screen cells. The above process is repeated until the error signal becomes lower than the set threshold signal or the set time period is up.

It is also possible to solve the calculations for the case of two (or more) different objects reconstructed in two (or more) different directions for two (or more) viewers. It must be mentioned specifically that all calculations can be performed in parallel; the DSP processors can be designed for this purpose. As indicated above, an artificial neural network can be advantageously used for problem solving in embodiments of the present invention because it allows for parallel processing, and because of the possibility of DSP integrated scheme application.

Thus, in this iterative manner, two "flat" (i.e., two-dimensional) images are calculated for projection onto the retro-reflective screen (one calculated image for each projector), taking into account the features of the retro-reflective screen and the pair of stereo images which are desired to be projected to a particular viewer to produce a perceived three-dimensional image. The fact that the calculated images that appear in the LCD panels of each projector are calculated has advantages in many applications. By using calculated images, the present invention can minimize superfluity and create three-dimensional images using liquid crystal panels that have lower resolution than that of photo materials.

It should also be noted that the system of the present invention may also be used with multiple viewers observing imagery simultaneously. The system simply recognizes the individual viewers' positions (or sets specific viewing zones) and stages images appropriate for the multiple viewers.

To adapt a system that uses a set image-viewing zone (or zones) so as to allow a viewer to move, a viewer position signal is input into the system. The algorithms used to determine calculated images necessarily include variables that reflect the optical geometry of the system. A viewer position signal can be used in a known manner to determine those variables. Also, the viewer position signal can be used to determine which stereopair to display, based on the optical geometry calculation. Numerous known technologies can be used for generating the viewer position signal, including known head/eye tracking systems employed for virtual reality ("VR") applications, such as, but not limited to, viewer mounted radio frequency sensors, triangulated infrared and ultrasound systems, and camera-based machine vision using video analysis of image data.

As will be readily appreciated by one skilled in the art, in certain embodiments of the invention, the illumination source in each projector can be a substantially broadband white-light source, such as an incandescent lamp, an induction lamp, a fluorescent lamp, or an arc lamp, among others. In other embodiments, the illumination source could be a set of single-color sources with different colors, such as red, green, and blue. These sources may be light emitting diodes ("LEDs"), laser diodes, or other monochromatic and/or coherent sources.

Although disclosed in a particular embodiment, it is clear that many other geometries and embodiments are possible without departing from the scope of the present invention. For example, the present invention more than two projectors, each projector can have its own location, the retro-reflective screen can be a hologram, and two or more video cameras can be used for a back connection between the screen image and images in each projector.

Figure 8:
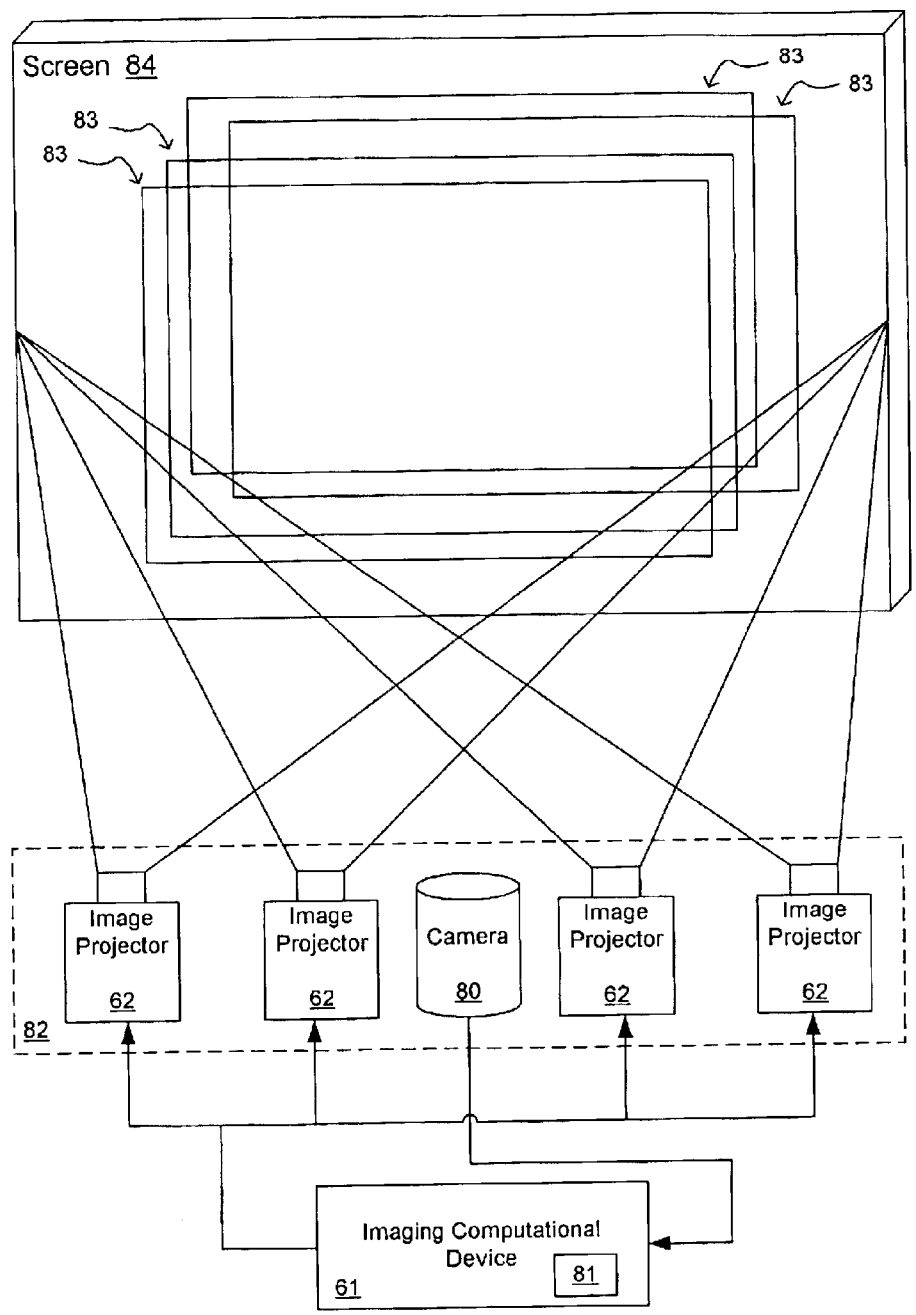
FIG. 8 is a schematic diagram depicting the parts of an image matching projection system according to embodiments of the present invention.

As depicted in FIG. 8, another embodiment of present invention provides a system and related scheme for multi-aspect image matching. Specifically, this embodiment of the present invention relates to a system to match the position of the aspects of the 3D image, thereby minimizing possible distortions of the optical system of the projectors. The system of FIG. 8, in addition to the imaging computational device 61 and the image projectors 62, generally includes a digital camera 80 electronically connected to the imaging computational device 61, image capturing and processing software 81 in the imaging computational device 61, and a screen 84. In general, the apparatus of FIG. 8 functions to create a feedback loop in which data related to the appearance of projected images is collected and analyzed to determine any modification to the projection system needed to achieve desired image characteristics.

The digital camera 80 is a well-known type of device that is commonly commercially available. The particular type of camera 80 may vary as needed. The camera 80 typically uses some type of radiation-to-electrical conversion technology, such as charge coupling devices (CCDs), to perform the function of collecting data on the projected image in an electronic format usable by the imaging computational device 61.

The projectors 62 and the camera 80 are configured on a platform 82. The platform is a structure used to positioning the projectors 62. At first, the placement and orientation of the projectors 62 may be randomly determined or may be configured using various known, standard procedures. While FIG. 8 depicts the projectors 62 being positioned in a linear orientation, other orientations may be used. For instance, the projectors may be positioned into an array or other geometric shapes or patterns. The camera 80 is typically positioned proximate to the center of the platform 82 and amidst the projectors 62.

The imaging computational device 61 and the image projectors 62 then operate as described above in FIGS. 6 and 7 and the accompanying text. Specifically, the imaging computational device 61 generally directs each of the image projectors 62 to project a test image 83 (generally a two-dimensional array of color points or a series of the orthogonal lines) onto a screen 84 in the manner described below.

One of the projectors 62, typically the projector that is nearest to the center of the platform 82, is used as a reference. This reference projector illuminates the test image 83 onto the screen 84 to create a reference test image. Then, the imaging computational device 61 directs a second projector 62 to also transmit the test image 83 onto the screen 84, so that the image projections from the two projectors 62 overlap on the screen 84. However, the imaging computational device 61 directs to the second projector 62 to emit a slightly modified image that differs from the reference test image. Generally, the image from the second projector differs in color from the reference image.

To ease detection of the differences in the test images 83 by the digital camera 80, the screen 84 is preferably a white paper or a conventional projection screen that is temporarily placed over the retro-reflection screen. In this way, the screen 84 has a substantially linear reflection quality to minimize screen-induced distortion of the projected test images 83.

The camera 80 captures this set of overlapped images 83 and sends data related to the images to the imaging computational device 61. The image capturing and processing software 81 in the imaging computational device 61 uses the image data captured by the camera 80 to calculate any mismatching of the illuminated test images 83 and the determine any necessary compensation of this distortions by the image preprocessing, as described in FIG. 7 and the accompanying text. Similarly, the results of the image capturing and processing software 81 may be used to physically reorient the projectors 62 on the platform 82.

In this way, the imaging computational device 61 receives the test image from the camera 80 and uses this test image to calculate the shape and the position of the images that will be sent to these two projectors for 3D image forming. In the same manner, the procedure may be repeated for other pairs of projectors 62 for projection images matching.

Following completion of the above-described image matching procedure, the screen 83 may be removed so that the system may operate as normal for 3D imaging.

Figure 9:
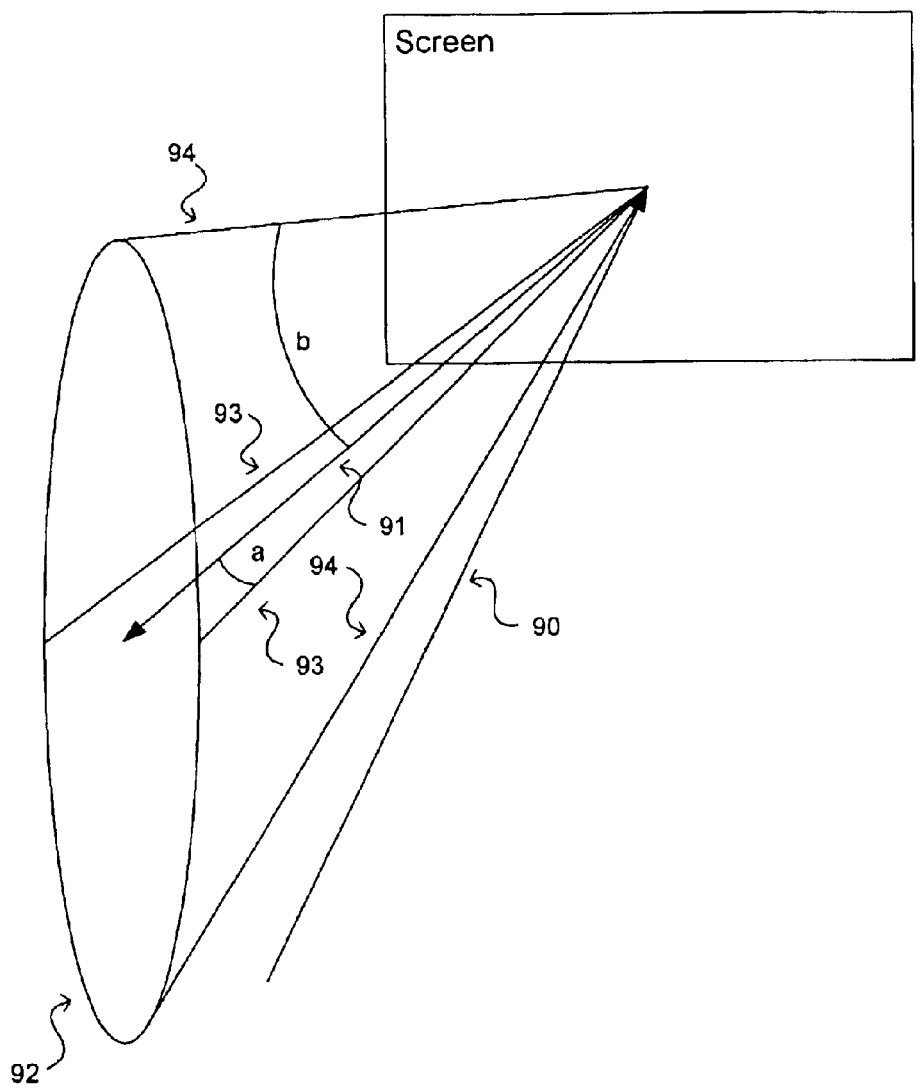
FIGS. 9–13 are schematic diagrams depicting a retro-reflector screen in accordance with embodiments of the projection system of FIG. 6.

As described above, the 3D projection system of the present invention generally includes a retro-reflective screen having an asymmetric scattering pattern. In one embodiment, the retro-reflective screen has a scattering pattern as depicted in FIG. 9. Specifically, FIG. 9 depicts a screen that functions a horizontal direction as a retro-reflective film with a relatively low (in the range of 3 degrees) Gaussian angular distribution, while having a wide-angle (in the range of 50-degrees or more) of scattering in the vertical direction. Thus, the retro-reflective screen produces a scattering pattern 92 from an incident ray 90. The scattering pattern 92 has horizontal scattering rays 93 that are relatively low-angled from the reflection ray 91. In contrast, the scattering pattern 92 has vertical scattering rays 94 that are the relatively large-angled from the reflection ray 91. These characteristics produce a 3D display having superior visual characteristics.

Figure 10:
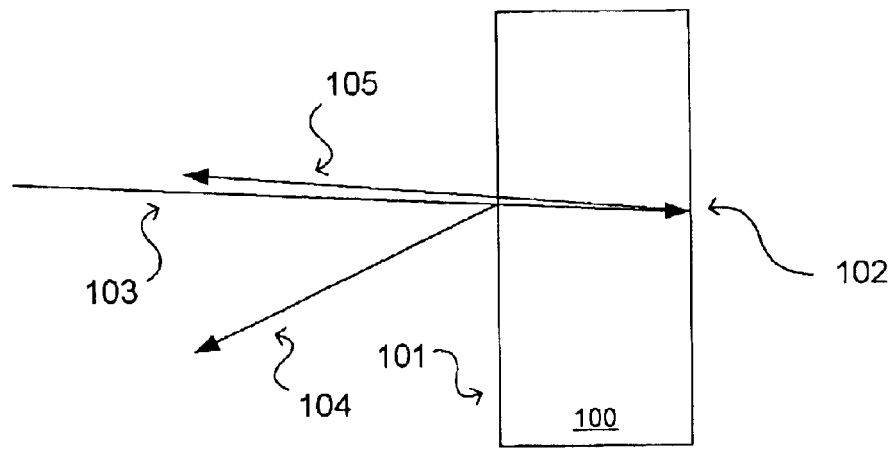

FIG. 10 depicts one possible embodiment of a retro-reflective screen having the desired scattering pattern of FIG. 9. FIG. 10 depicts a screen 100 that is formed by embossing two series of micro-prisms on a transparent polymer film. A front surface 101 is embossed with high spatial frequency horizontal prisms to direct wide angle vertical scattering 104 from an incident ray 103. Specifically, the front surface horizontal prisms have a special frequency in the range of 50-200 mkm. In contrast, a rear surface 102 is embossed with low spatial frequency 90-degree micro-prisms that perform one-dimensional retro-reflection on total internal reflection. The rear surface vertical prisms have a special frequency in the range of 5 to 20 mkm. This configuration produces relatively low-angled horizontal scattering rays 105 from the incident ray 103.

Figure 11:
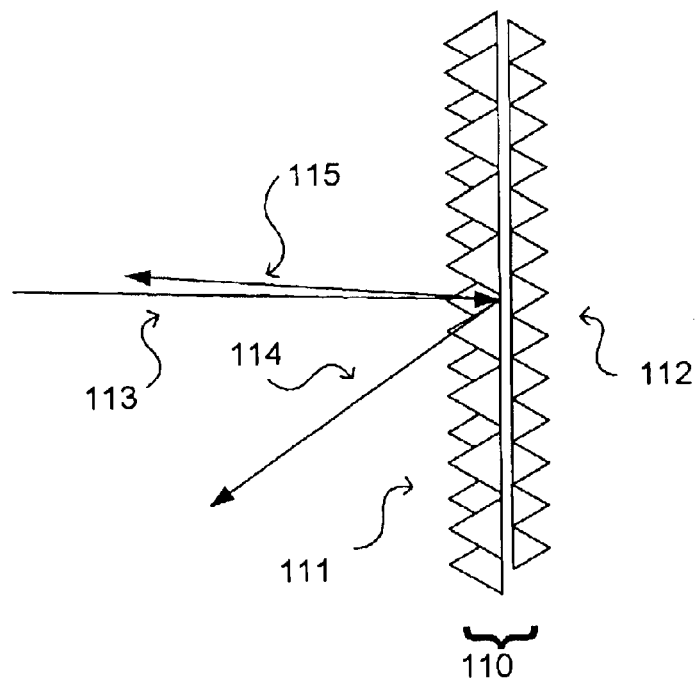
Figure 12:
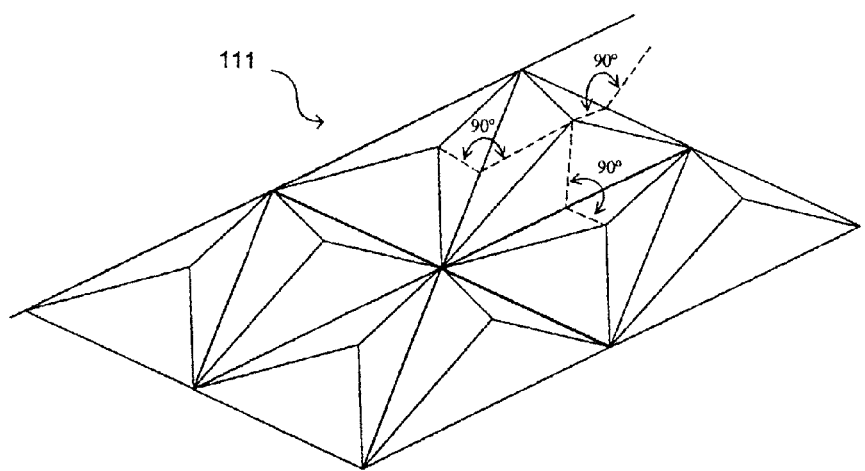
Figure 13:
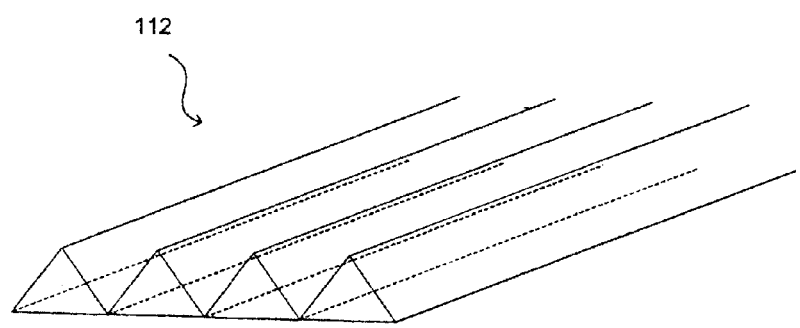

Another possible embodiment of the retro-reflective screen is depicted in FIG. 11. A composite screen 110 is formed by the combination of two films. Specifically, essential scattering in the retro-reflector screen 110 can be achieved by the combination of a micro-prism retro-reflector film 111 and a one-dimensional micro-prism array scattering film 112. This combination forms the retro-reflective screen 110 that produces the desired scattering pattern having wide-angle vertical scattering rays 114 and relatively low-angle horizontal scattering rays 115 from an incident ray 113. The micro-prism retro-reflector film 111 and the one-dimensional micro-prism array scattering film 112 are depicted in greater detail, respectively, in FIGS. 12 and 13.

While preferred embodiments of the present invention have been shown and described herein, it will be obvious to those skilled in the art such embodiments are provided by way of example only. Numerous insubstantial variations, changes, and substitutions will now be apparent to those skilled in the art without departing from the scope of the invention disclosed herein by the Applicants. Accordingly, it is intended that the invention be limited only by the spirit and scope by the claims as follows.

What is claimed is:

1. A method for producing a perceived three dimensional image of an object, said method comprising:
   obtaining a retro-reflective screen, said screen having a known non-linear light reflection pattern;
   aligning at least two image projectors in a geometry so as to be able to project images onto said screen;
   simultaneously calculating separate two-dimensional images, one each or projecting by a different one of said projectors, said calculated images being determined from stereopair image information regarding the object and from said pattern and said geometry; each said calculated image simultaneously containing at least some image information intended for the left eye and at least some image information intended for the right eye; and
   projecting said calculated images from said projectors onto said screen such that they reflect off said screen in a superimposed manner that produces a three-dimensional image of said object to a viewer at a known location.

2. The method according to claim 1, wherein said pattern comprises a Gaussian distribution.

3. The method according to claim 1, wherein said pattern has relatively wide-angle vertical scattering and relatively low-angle horizontal scattering.

4. The method according to claim 1, wherein said projectors include tramsmissive liquid crystal display panels for displaying said calculated images.

5. The method according to claim 1, wherein said calculate images are iteratively calculated to reduce error in said three-dimensional image of said object.

6. The method according to claim 5, wherein said iterative calculations of said calculated images is performed by a computational device employing a neural network.

7. The method according to claim 1, wherein said calculate images are obtained by the steps of:
   estimating the light wave components being created by individual pixels of a display in each projector when displaying each said calculated image;
   calculating a resulting three dimensional image of an object from the expected interaction of said estimated light wave components and said known pattern;
   comparing the resulting three dimensional image with a desired three dimensional image to obtain a degree of error; and
   adjusting said flat image until said error reaches a predetermined threshold.

8. The method according to claim 7, wherein said steps for calculating said amplitude information is performed using a neural network.

9. The method according to claim 1, further comprising sensing the location of said viewer.

10. The method according to claim 1, wherein said step of simultaneously calculating separate two-dimensional images for projecting by each projector comprising solving a system of non-linear equations.

11. The method according to claim 1 further comprising the steps of:
    projecting a test image each from of the projectors;
    capturing and comparing said projected test images; and
    modifying the projection of the calculated images as needed match the projection from the projectors.

12. A system for producing a perceived three-dimensional image of an object, said system comprising:
    a retro-reflective screen, said screen having a known non-linear light reflection pattern;
    at least two projectors capable of projecting two dimensional images o to said screen, said projectors being aligned in a geometry relative to said screen, and said projectors each containing electronically switchable displays for producing two-dimensional images;
    an imaging computational device containing a processor, said device being adapted to control pixels of said displays, and said device being adapted to generate a seperate flat image for each display, said flat images being calculated by said device using said pattern and said geometry and electronic stereopair images of the object; each said flat image simultaneously containing at least some image information intended for the left eye and at least some image information intended for the right eye.

13. The system according to claim 12, wherein said display is a transmissive liquid crystal display panel.

14. The system according to claim 12, each projector comprising at least three transmissive displays and at least three light sources, each said transmissive display and each said light source being adapted to produce one of three color components of said flat images, said color components of said flat image being combinable to produce a full color three dimensional image of said object.

15. The system according to claim 12, wherein said flat images are iteratively calculated in said computational device to reduce error in said three dimensional image of said object.

16. The system according to claim 15, wherein said computational device employs a neural network to reduce error in said three dimensional image of said object.

17. The system according to claim 12, wherein said computational device calculates said flat images by operating according to the steps of:

estimating the light wave components being created by individual pix is of said display when displaying said flat image;

calculating a resulting three dimensional image of an object from the expected interaction of said estimated light wave components and said pattern of said screen;

comparing the resulting three dimensional image with a desired three dimensional image to obtain a degree of error; and adjusting said flat image until said error reaches a predetermined threshold.

18. The system according to claim 17, wherein said steps for calculating said amplitude information is performed using a neural network.

19. The system according to claim 12, wherein said display control system further comprises means for sensing a spatial orientation of a viewer of said three dimensional image, and wherein said computational device is adapted to adjust said generated flat images such that said viewer can perceive said three dimensional image of the object.

20. The system according to claim 12, wherein said computational device simultaneously calculates said flat images for projecting by each projector by solving a system of non-linear equations.

21. The system according to claim 12, further comprising at east four projectors whereby said system can display two separate perceived three-dimensional views of said object to two different viewers.

22. The system according to claim 12, wherein said pattern comprises a Gaussian distribution.

23. The system according to claim 12, wherein said pattern comprises relatively wide-angle vertical scattering and relatively low-angle horizontal scattering.

24. The system according to claim 12 further comprising a camera electronically connected to said imaging computational device, wherein said imaging computational device receives an image captured by said camera and uses said captured image to modify the generation of said separate flat images.

25. A system for producing a perceived three-dimensional image of an object, said system comprising:

a retro-reflective screen, said screen having a known non-linear light reflection pattern and comprising a film having a first surface embossed with high spatial frequency micro-prisms and a second surface embossed with low spatial frequency micro-prisms;

at least two projectors capable of projecting two dimensional images onto said screen, said projectors being aligned in a geometry relative to said screen, and said projectors each containing electronically switchable displays for producing two-dimensional images;

an imaging computational device containing a processor, said device being adapted to control pixels of said displays, and said device being adapted to generate a seperate flat image for each display, said flat images being calculated by said device using said pattern and said geometry and electronic stereopair images of the object.

26. The system according to claim 25, wherein said flat images are iteratively calculated in said computational device to reduce error in said three dimensional image of said object.

27. The system according to claim 26, wherein said computational device employs a neural network to reduce error in said three dimensional image of said object.

28. The system according to claim 25, wherein said computational device calculates said flat images by operating according to the steps of:

estimating the light wave components being created by individual pixel of said display when displaying said flat image;

calculating a resulting three dimensional image of an object from the expected interaction of said estimated light wave components and said pattern of said screen;

comparing the resulting three dimensional image with a desired three dimensional image to obtain a degree of error; and adjusting said flat image until said error reaches a predetermined threshold.

29. The system according to claim 28, wherein said steps for calculating said amplitude information is performed using a neural network.

30. The system according to claim 25, wherein said display control system further comprises means for sensing a spatial orientation of a viewer of said three dimensional image, and wherein said computational device is adapted to adjust said generate flat images such that said viewer can perceive said three dimensional image of the object.

31. The system according to claim 25, wherein said pattern comprises relatively wide-angle vertical scattering and relatively low-angle horizontal scattering.

32. A system for producing a percieved three-dimensional image of an object, said system comprising:

a retro-reflective screen, said screen having a known non-linear light reflection pattern and comprising a micro-prism retro-reflector film and a one-dimensional micro-prism array scattering film;

at least two projectors capable of projecting two dimensional images onto said screen, said projectors being aligned in a geometry relative to said screen, and said projectors each containing electronically switchable displays for producing two-dimensional ages;

an imaging computational device containing a processor, said device being adapted to control pixels of said displays, and said device being adapted to generate a seperate flat image for each display, said flat images being calculated by said device using said pattern and said geometry and electronic stereopair images of the object.

33. The system according to claim 32, wherein said flat images are iteratively calculated in said computational device to reduce error in said three dimensional image of said object.

34. The system according to claim 33, wherein said computational device employs a neural network to reduce error in said three dimensional image of said object.

35. The system according to claim 32, wherein said computational device calculates said flat images by operating according to the steps of:

estimating the light wave components being created by individual pixels of said display when displaying said flat image;

calculating a resulting three dimensional image of an object from the expected interaction of said estimated light wave components and said pattern of said screen;

comparing the resulting three dimensional image with a desired three dimensional image to obtain a degree of error; and adjusting said flat image until said error reaches a predetermined threshold.

36. The system according to claim 35, wherein said steps for calculating said amplitude information is performed using a neural network.

37. The system according to claim 32, wherein said display control system further comprises means for sensing a spatial orientation of a viewer of said three dimensional image, and wherein said computational device is adapted to adjust said generated flat images such that said viewer can perceive said three dimensional image of the object.

38. The system according to claim 32, wherein said pattern comprises relatively wide-angle vertical scattering and relatively low-angle horizontal scattering.

* * * * *